United States Patent [19]

Konno

[11] Patent Number: 4,737,809
[45] Date of Patent: Apr. 12, 1988

[54] STATIC ELECTRICITY ELIMINATING MECHANISM FOR CAMERA

[75] Inventor: Tatsuo Konno, Kanagawa, Japan

[73] Assignee: Canon Kabushiki Kaisha, Tokyo, Japan

[21] Appl. No.: 933,904

[22] Filed: Nov. 24, 1986

[51] Int. Cl.⁴ .......................... G03B 1/04; H01H 47/00
[52] U.S. Cl. ...................................... 354/212; 361/220
[58] Field of Search ................... 361/220; 354/3, 202, 354/212, 288

[56] References Cited

U.S. PATENT DOCUMENTS 1,530,704  3/1925  Thomson .................... 361/220 X
3,128,687  4/1964  Dahlgren ...................... 354/203
4,482,229  11/1984  Sugiura ...................... 354/288 X Primary Examiner—Donald A. Griffin
Attorney, Agent, or Firm—Fitzpatrick, Cella, Harper & Scinto

[57] ABSTRACT

A mechanism for eliminating static electricity for a camera in which the static electricity charge on a photographic film or a magnetic tape is led to a grounding part formed on a camera body through a guide roller means made of electrically conductive material which is constantly pressed, while rotating, into contact with the photographic film or the magnetic tape which is wound up onto a winding spool.

7 Claims, 3 Drawing Sheets

STATIC ELECTRICITY ELIMINATING MECHANISM FOR CAMERA

BACKGROUND OF THE INVENTION

1. Field of the Invention:

The present invention relates to a camera having a mechanism for eliminating static electricity generated and charged on a photographic film or a magnetic tape during the feeding of said film or tape, thereby preventing occurrence of photographic fog, noise, malfunction or the like owing to such static electricity.

2. Description of the Related Art:

Under dry circumstances, such as in winter, a photographic film or a magnetic tape used in a camera tends to be dry and, particularly at the time of high-speed and continuous photographing in which the film or the tape is continuously fed by motor driving device or the like, static electricity is generated by friction, so that the film or the tape becomes charged with the static electricity.

Heretofore, various problems have been raised due to the static electricity. For example, a photographic fog may occur because of discharge of the static electricity to the photographic film. In a camera of modern type in which many integrated circuits are utilized, a malfunction may occur due to noise produced at the time of discharging of the static electricity.

SUMMARY OF THE INVENTION

It is an object of the present invention to provide a camera having a simple mechanism for eliminating static electricity charged on a photographic film or a magnetic tape by leading the static electricity to ground.

In order to attain such an object, the present invention provides a camera having a mechanism for eliminating static electricity in which the static electricity charged on a photographic film or a magnetic tape is led to a grounding part formed on a camera body through guide roller means made of electrically conductive material which is constantly pressed, while rotating, into contact with the photographic film or the magnetic tape which is wound up onto a winding spool.

DETAILED DESCRIPTION OF THE PREFERRED EMBODIMENTS

Now, the present invention will be described with reference to the drawings.

Figure 1:
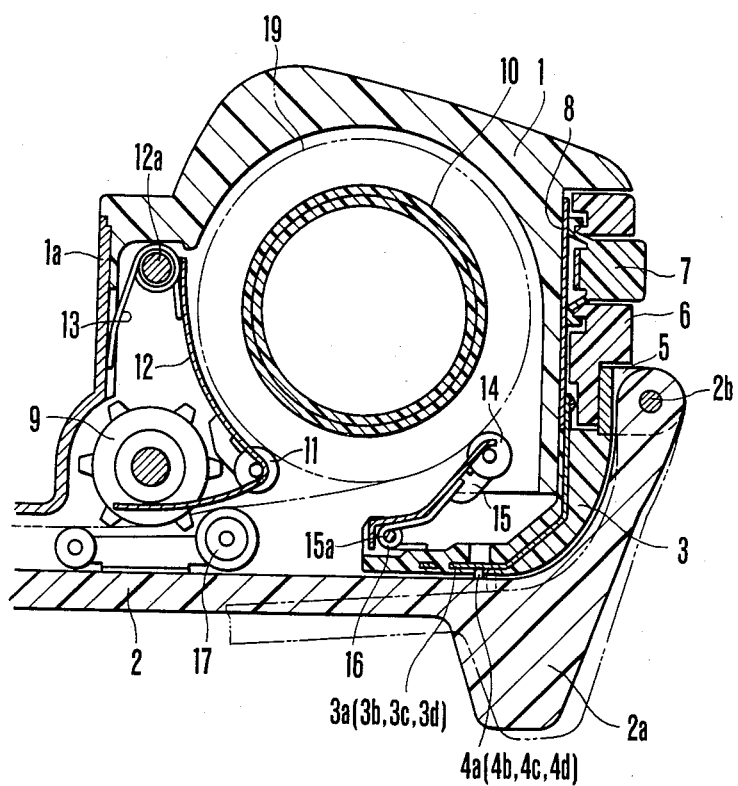
FIG. 1 is a sectional view of a part of a camera including a mechanism for eliminating static electricity of a photographic film according to an embodiment of the present invention.
Figure 2:
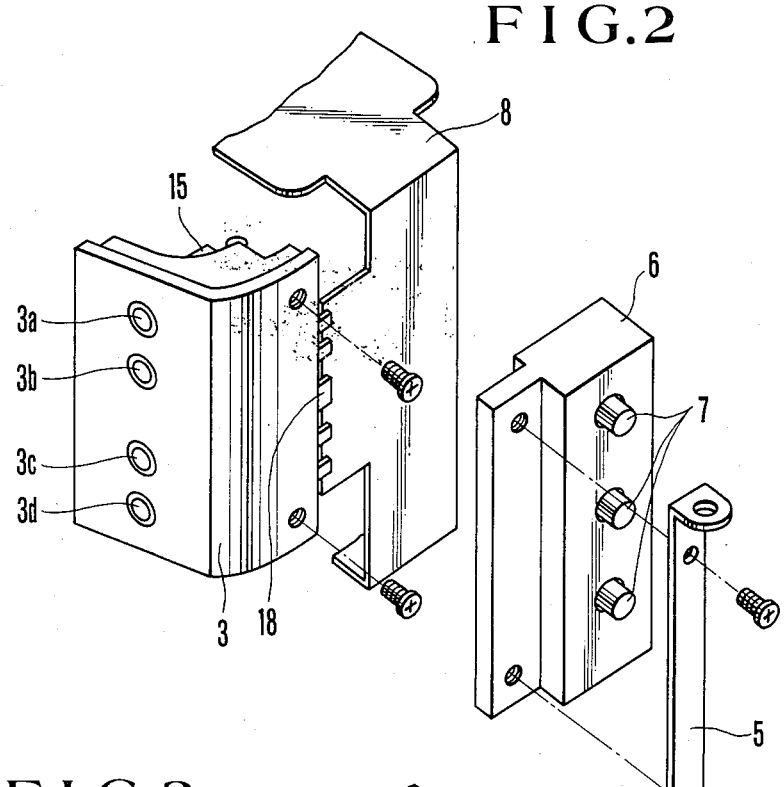
FIG. 2 is an exploded perspective view showing an essential part of the mechanism shown in FIG. 1.
Figure 3:
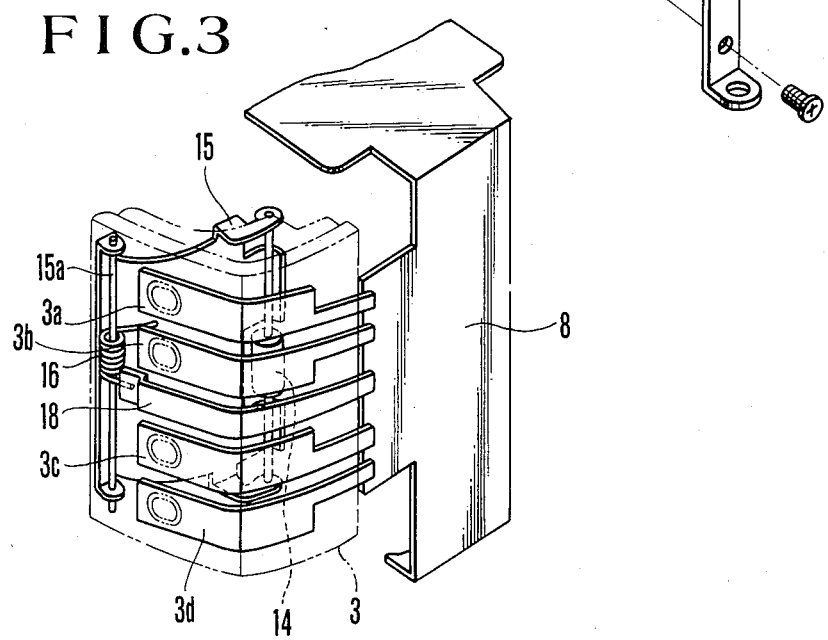
FIG. 3 is a perspective view showing another essential part of the mechanism shown in FIG. 1.

FIGS. 1 through 3 illustrate a first embodiment of the present invention. Referring to the drawings, a camera body 1 is made as a two-piece body in which a metallic plate 1a is integrally formed in a body part of resinous material by an insert-molding process. A rear cover 2 is detachably and exchangeably mounted on the camera body. The rear cover 2 has a finger grip portion 2a, on which a photographer can put the thumb of his right hand when he holds the camera, and a pivot shaft 2b by which the rear cover is pivotally mounted on the camera body. The camera body has a holder 3 which supports a member which constitutes a part of an automatic film loading mechanism. The holder 3 has contact pieces 3a, 3b, 3c and 3d and a grounding contact piece 18 formed therein by insertmolding. The contact pieces 3a, 3b, 3c and 3d have terminals at the side of the camera body and they are arranged to be electrically connected with the rear cover 2. The rear cover 2 has movable terminals 4a, 4b, 4c and 4d mounted thereon, which correspond to the contact pieces 3a, 3b, 3c and 3d, respectively. These movable terminals 4a, 4b, 4c and 4d are resiliently biased to their projected positions by spring means (not shown). These movable terminals are arranged near the finger grip portion 2a, so that a wider space can be formed in the camera body and a larger freedom in design of movable mechanisms and mounting construction can be obtained.

A hinge plate 5 for pivotally mounting the pivot shaft 2b of the rear cover 2 and a holder 6 for supporting operating buttons 7 are fixedly mounted on one side of the camera body 1 by means of set screws, and a flexible printed circuit board 8 is held therebetween. The flexible printed circuit board 8 has a switching pattern for the operating buttons 7 and a wiring pattern is connected to the contact pieces 3a, 3b, 3c and 3d and one end of the grounding contact piece 18 by soldering or the like. The wiring pattern connected to the grounding contact piece is connected to a contact piece of a battery (not shown).

A sprocket wheel 9 and a winding spool 10 are arranged in the camera body 1 and photographic film 19 is wound up onto the winding spool 10 through the sprocket wheel 9. Guide rollers 11 and 14 made of electric conductive material are constantly pushed into contact with the photographic film. The guide roller 11 is pivotally supported by a film guide cover 12, which is rotatably supported by a shaft 12a on the camera body 1 and is constantly energized by means of a coil spring 13 toward the winding spool 10. The guide roller 14 is pivotally supported by a film guide cover 15, which is rotatably supported by a shaft 15a on the abovementioned holder 3 and is constantly energized by means of a coil spring 16 toward the winding spool 10. The coil spring 13 makes contact, at its fixed end, with the metallic plate 1a of the camera body 1, while the coil spring 16 makes contact, at its fixed end, with the grounding contact piece 18 which is partly exposed from the holder 3. The camera body is further provided with a roller 17, which is arranged at an inner side of the rear cover 2 in confronting relation to the sprocket 9, to press the photographic film 19 against the sprocket.

In the construction as described above, when the photographic film 19 charged with static electricity is wound up onto the winding spool 10, the film 19 is held in pressure contact with the guide rollers 11 and 14. Accordingly, the static electricity is led from the guide roller 11 through the film guide cover 12 and the coil spring 13 to the metallic plate 1a which forms a grounding part, directly, while the static electricity is also led from the guide roller 14 through the film guide cover 15, the coil spring 16 and the grounding contact piece 18 to a grounding part of the camera body. Thus the static electricity charged on the photographic film is eliminated.

Although the description was given to two grounding routes formed by the coil spring 13 and the coil spring 16, it is not always required to ground the both springs 13 and 16 since the static electricity eliminating effect can be obtained by one of the two grounding routes.

Figure 4:
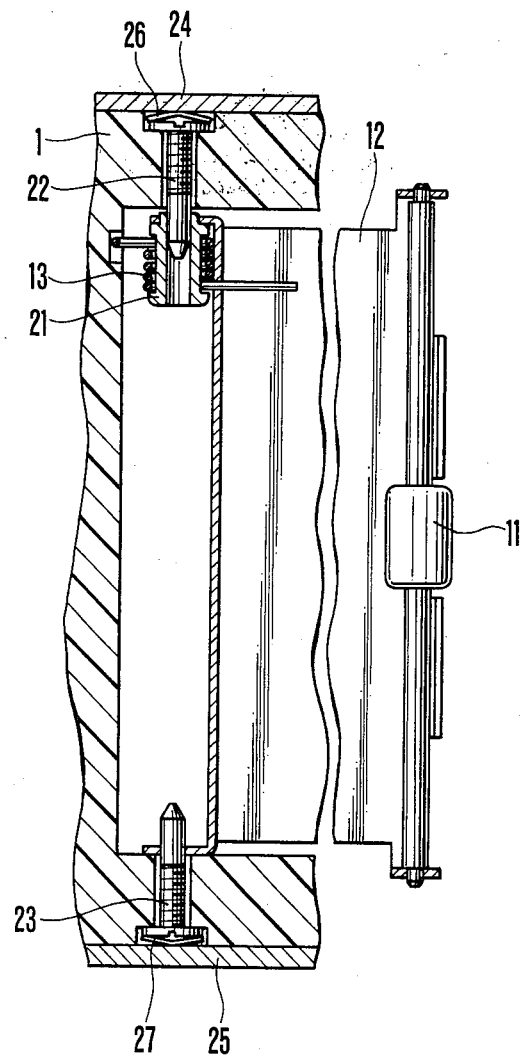
FIG. 4 is a longitudinal sectional view showing an essential part of another embodiment of the present invention.

FIG. 4 illustrates another embodiment of the present invention. In order to simplify the explanation of this embodiment, the parts having same functions as those of the parts shown in FIGS. 1 through 3 are indicated by the same reference numerals in FIG. 4, respectively.

Referring to FIG. 4, a camera body 1 has a film guide cover 12, which has a guide roller 11 rotatably supported at its one end. A bearing 21, which also serves as a guide for guiding a coil spring 13, is fixed to the upper end of the other end of the film guide cover 12, and a screw 22 threadedly fixed on the camera body 1 is loosely fitted in the bearing 21. Another screw 23 threadedly fixed on the camera body 1 is loosely fitted in the lower end of the other end of the film guide cover 12. These screws constitute a pivotal axis of the film guide cover. Plates 24 and 25 made of an electrically conductive material are fixed on the upper and lower surfaces of the camera body 1, respectively. These plates 24 and 25 serve to hold various functional components for operating the camera and they are connected to the grounding part of the camera body. Thin plates 26 and 27, which have electric conductive and elastic properties, are interposed between the plate 24 and the screw 22 and between the plate 25 and the screw 23, respectively, to assure electrical contacts therebetween.

Accordingly, at the time when the film charged with static electricity comes into contact with the guide roller 11 the static electricity is led through the film guide cover 12, the bearing 21, the screws 22 and 23, the thin plates 26 and 27 and the plates 24 and 25 to the grounding part of the camera body, whereby the static electricity is eliminated.

The above-mentioned embodiment requires such conditions that the plates 24 and 25 should be connected to the ground but this embodiment is particularly effective in such case that the camera body is made of an insulating material such as a molded body of plastic material.

Although the description was given to an embodiment in which two thin plates 26 and 27 are disposed at the upper and lower sides of the film guide cover 12, it is, of course, possible to remove one of them. Furthermore, if possible, the grounding may be effected at the film guide roller side, as in the case of the film guide roller 14 in the embodiment as shown in FIGS. 1 through 3.

According to the embodiments as described above, the film guide rollers 11 and 14 made of electric conductive material are constantly pressed, while rotating, into contact with the photographic film 19 wound up onto the winding spool 10 and the static electricity charged on said photographic film 19 is led through said film guide rollers 11 and 14 to the grounding member formed on the camera body 1. Accordingly, the static electricity charged on the photographic film can be easily eliminated by leading said static electricity through the electric conductive guide rollers 11 and 14, which are constantly held in pressure contact with the photographic film 19, to the grounding member of the camera body, with the result that the photographic fog of the photographic film or the malfunction of the camera owing to the static electricity can be avoided.

Although the description was given to the embodiments of the camera in which the photographic film is used, the present invention can be equally applied to a camera in which other belt-like recording medium such as magnetic tape is used, with the same technical advantage.

It will be understood that the present invention provides a camera in which static electricity charged on a belt-like recording medium such as photographic film or magnetic tape is led to a grounding part of a camera body, thereby eliminating the static electricity of the belt-like recording medium, by utilizing at least one electric conductive roller which is constantly held in contact with the belt-like recording medium, with the result that a photographic fog or a malfunction of a camera caused by the static electricity can be simply and completely avoided, without requiring any special mechanism.

What is claimed is:

1. A camera having a camera body in which a belt-like recording medium is used, comprising:
   (a) grounding means formed in the camera body;
   (b) rotatable guide roller means made of electrically conductive material for guiding the belt-like recording medium during feeding of said belt-like recording medium in the camera body; and
   (c) means for electrically connecting said guide roller means with said grounding means of the camera body;
   (d) elastic means made of electric conductive material for elastically urging said guide roller means to said recording medium.

2. A camera having a camera body in which a belt-like recording medium is used, comprising:
   (a) grounding means formed in the camera body;
   (b) rotatable guide roller means made of electrically conductive material for guiding the belt-like recording medium during feeding of said belt-like recording medium in the camera body; and
   (c) means for electrically connecting said guide roller means with said grounding means of the camera body; wherein said means for electrically connecting the guide roller means with the grounding means is constituted by a pattern electrically connected with a contact piece of an electric battery, said pattern being formed on a printed circuit board.

3. A camera having a camera body in which a photographic film is used, comprising:
   (a) grounding means formed in the camera body;
   (b) a winding spool for winding up the photographic film;
   (c) guide roller means made of electric conductive material for guiding the photographic film during feeding of said photographic film in the camera body, said guide roller means being arranged near said winding spool;
   (d) means for electrically connecting said guide roller means with said grounding means of the camera body; and
   (e) elastic means made of electric conductive material for elastically urging said guide roller means to said photographic film.

4. A camera according to claim 3, in which said guide roller means includes two guide rollers arranged near said winding spool.

5. A camera according to claim 4, in which said guide rollers are arranged to assist winding of a leader portion of the film onto said winding spool to effect autoloading of a photographic film.

6. A camera according to claim 3, in which said grounding means is formed by at least one metallic plate which constitutes a part of the camera body.

7. A camera according to claim 3, in which said means for electrically connecting the guide roller means with the grounding means is constituted by a pattern electrically connected with a contact piece of an electric battery, said pattern being formed on a printed circuit board.

* * * * *

UNITED STATES PATENT AND TRADEMARK OFFICE
CERTIFICATE OF CORRECTION

PATENT NO. : 4,737,809
DATED : April 12, 1988
INVENTOR(S) : Tatsuo KONNO

It is certified that error appears in the above-identified patent and that said Letters Patent is hereby corrected as shown below:

COLUMN 2

Line 8, "insertmolding" should read --insert-molding.--.

Line 44, "abovemen-" should read --above-men--.

COLUMN 3

Line 1, "to" should read --of--.

Line 31, "contacts" should read --contact--

Line 45, "to" should read --of--.

COLUMN 4

Line 1, "to" should read --of--.

Line 26, "and" should be deleted.

UNITED STATES PATENT AND TRADEMARK OFFICE
CERTIFICATE OF CORRECTION

PATENT NO. : 4,737,809

DATED : April 12, 1988

INVENTOR(S) : Tatsuo Konno

It is certified that error appears in the above-identified patent and that said Letters Patent is hereby corrected as shown below:

Line 29, "body" should read -- body; and --.

Signed and Sealed this

Eighth Day of November, 1988

*Attest:*

DONALD J. QUIGG

*Attesting Officer*      *Commissioner of Patents and Trademarks*